US008814241B2

(12) United States Patent
Kim et al.

(10) Patent No.: US 8,814,241 B2
(45) Date of Patent: Aug. 26, 2014

(54) ROBOT HAND

(75) Inventors: Yong Jae Kim, Seoul (KR); Duke Kimm, Suwon-si (KR); Sang Il Hong, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 54 days.

(21) Appl. No.: 13/229,841

(22) Filed: Sep. 12, 2011

(65) Prior Publication Data
US 2012/0068486 A1 Mar. 22, 2012

(30) Foreign Application Priority Data

Sep. 17, 2010 (KR) .................... 10-2010-0091492

(51) Int. Cl.
| | | |
|---|---|---|
| *B25J 15/10* | (2006.01) | |
| *B25J 15/00* | (2006.01) | |
| *B25J 15/08* | (2006.01) | |

(52) U.S. Cl.
CPC ............ *B25J 15/0009* (2013.01); *B25J 15/086* (2013.01); *B25J 15/10* (2013.01); *Y10S 901/38* (2013.01); *Y10S 901/39* (2013.01)
USPC ................ 294/106; 294/213; 901/38; 901/39

(58) Field of Classification Search
USPC .......... 294/106, 111, 213; 901/38, 39; 623/64
See application file for complete search history.

(56) References Cited

U.S. PATENT DOCUMENTS

| | | | | | |
|---|---|---|---|---|---|
| 2,549,716 | A | * | 4/1951 | Simpson .......................... | 623/64 |
| 3,901,547 | A | * | 8/1975 | Skinner, II .................... | 294/195 |
| 4,364,593 | A | * | 12/1982 | Maeda .......................... | 294/106 |
| 4,623,183 | A | * | 11/1986 | Aomori ....................... | 294/86.4 |
| 4,697,839 | A | * | 10/1987 | Fischer ........................ | 294/115 |
| 4,858,979 | A | * | 8/1989 | Parma .......................... | 294/106 |
| 5,161,846 | A | * | 11/1992 | Yakou .......................... | 294/106 |
| 5,447,403 | A | * | 9/1995 | Engler, Jr. ......................... | 414/4 |
| 5,570,920 | A | * | 11/1996 | Crisman et al. ............... | 294/111 |
| 6,913,627 | B2 | * | 7/2005 | Matsuda ........................ | 623/64 |
| 7,059,645 | B2 | * | 6/2006 | Kameda et al. ............... | 294/106 |
| 7,556,299 | B2 | * | 7/2009 | Koyama ....................... | 294/106 |
| 2006/0158146 | A1 | | 7/2006 | Tadano | |
| 2009/0025502 | A1 | | 1/2009 | Nakamoto | |
| 2010/0176615 | A1 | | 7/2010 | Okuda et al. | |

FOREIGN PATENT DOCUMENTS

JP 2010-76050 4/2010

OTHER PUBLICATIONS

European Search Report dated Dec. 1, 2011 issued in corresponding European Patent Application No. 11181358.0.

* cited by examiner

*Primary Examiner* — Dean Kramer
(74) *Attorney, Agent, or Firm* — Staas & Halsey LLP

(57) ABSTRACT

A robot hand, which has an arbitrary object grasping function in the same manner as a human hand and a high precision and stable grasping function in the same manner as an industrial gripper and performs a pose similar to a human hand while having complete opposability without any increase in complexity or degree of freedom. The robot hand includes a base part, and a plurality of finger connection parts, and a plurality of finger modules connected to the plurality of finger connection parts. The finger connection parts connected to the base part are connected to adjacent finger connection parts by roll joints such that each pair the finger connection parts connected by the roll joints is driven together, and the finger connection parts adjacent to the finger connection parts connected to the base part are driven separately from the finger connection parts connected to the base part.

33 Claims, 10 Drawing Sheets

ROBOT HAND

CROSS-REFERENCE TO RELATED APPLICATIONS

This application claims the benefit of Korean Patent Application No. 2010-0091492, filed on Sep. 17, 2010 in the Korean Intellectual Property Office, the disclosure of which is incorporated herein by reference.

BACKGROUND

1. Field

Embodiments relate to a robot hand enabling symmetrical grasping.

2. Description of the Related Art

In general, utilization of robots continues to expand to a wider range of overall industries, and research and development of humanoid robots has been accelerated.

In order to allow a humanoid robot to assist human housework, rapid grasping or manipulation of various objects used by the human is important.

For this purpose, humanoid hands having high degree of freedom and size and function similar to those of humans have been developed.

Most humanoid hands include 4~5 fingers and have high degree of freedom, i.e., 8~15 degrees of freedom.

These humanoid hands are advantageous in that they enable the use of tools in a similar manner as humans. These humanoid hands also enable operation in environments designed for humans in a similar manner as humans. Moreover, these humanoid hands enable grasping and manipulating an arbitrary object in a similar manner as humans.

On the other hand, industrial grippers are designed to precisely and stably grasp a specific object.

Most industrial grippers include 2~4 fingers, and the respective fingers are designed according to sizes and shapes of objects to be grasped.

Further, these industrial grippers have 1~4 degrees of freedom lower than those of the humanoid hands.

Moreover, since all the fingers of the industrial grippers have the same shape and form complete symmetry (opposability), the industrial grippers achieve precise and stable grasping.

However, when a new object needs to be grasped, a gripper needs to be replaced with a different one, and has difficulty in using a tool designed for humans.

If humanoid hand mechanisms and grasping techniques are applied to an industrial robot, the industrial robot becomes capable of grasping and manipulating an arbitrary object located at an arbitrary position.

Therefore, such an industrial robot may grasp various objects with one kind of hand without conventional gripper replacement, and use tools designed for humans, as needed.

However, the humanoid hands have been developed so as to satisfy requirements of high degree of freedom, miniaturization and flexibility, and thus are difficult to keep up with positional accuracy, grasp stability and stiffness of the industrial grippers.

Accordingly, introduction of a hand mechanism having advantages of both the humanoid hands and the industrial grippers is required.

SUMMARY

Therefore, it is an aspect of an embodiment to provide a robot hand which has both an arbitrary object grasping function in the same manner as a human hand and a high precision and stable grasping function in the same manner as an industrial gripper.

It is another aspect of an embodiment to provide a robot hand which performs a pose similar to a human hand while having complete opposability without any increase in complexity or degree of freedom.

Additional aspects of embodiments will be set forth in part in the description which follows and, in part, will be obvious from the description, or may be learned by practice of embodiments.

In accordance with an aspect of an embodiment, a robot hand includes a base part, a plurality of finger connection parts provided on the base part such that some of the plurality of finger connection parts are connected to the base part, and a plurality of finger modules respectively connected to the plurality of finger connection parts so as to grasp an object, wherein, among the plurality of finger connection parts, finger connection parts connected to the base part are respectively connected to adjacent finger connection parts by roll joints such that each pair of the finger connection parts connected by the roll joints is driven together, and the finger connection parts adjacent to the finger connection parts connected to the base part are driven separately from the finger connection parts connected to the base part so that the plurality of finger modules performs symmetrical grasping.

The finger connection parts connected to the base part may include a second finger connection part and a third finger connection part, the second finger connection part may be connected to a first finger connection part adjacent to the second finger connection part by the roll joints, and the third finger connection part may be connected to a fourth finger connection part adjacent to the third finger connection part by the roll joints.

The roll joints connecting the second finger connection part and the first finger connection part and the roll joints connecting the third finger connection part and the fourth finger connection part may be formed so as to surround wires in a figure 8 shape.

In accordance with another aspect of an embodiment, a robot hand includes a base part, a plurality of finger connection parts provided on the base part such that some of the plurality of finger connection parts are connected to the base part, and a plurality of finger modules respectively connected to the plurality of finger connection parts so as to grasp an object, wherein, among the plurality of finger connection parts, finger connection parts connected to the base part are respectively connected to adjacent finger connection parts by roll joints such that each pair of the finger connection parts connected by the roll joints is driven together, the finger connection parts adjacent to the finger connection parts connected to the base part are driven separately from the finger connection parts connected to the base part so that the plurality of finger modules performs symmetrical grasping, and the plurality of finger connection parts connected by the roll joints is driven via connection of links.

The finger connection parts connected to the base part may include a second finger connection part and a third finger connection part, the second finger connection part may be connected to a first finger connection part adjacent to the second finger connection part by the roll joints, and the third finger connection part may be connected to a fourth finger connection part adjacent to the third finger connection part by the roll joints.

The roll joints connecting the second finger connection part and the first finger connection part and the roll joints connecting the third finger connection part and the fourth finger connection part may be formed so as to surround wires in a figure 8 shape.

In order to drive the second finger connection part and the first finger connection part connected by the roll joints and the third finger connection part and the fourth finger connection part connected by the roll joints, the second finger connection part and the first finger connection part may be connected by a first link and the third finger connection part and the fourth finger connection part may be connected by a second link.

Motors and speed reducers may be installed in the second finger connection part and the third finger connection part so that the second finger connection part and the third finger connection part are rotated with respect to the base part by the motors and the speed reducers. When the second finger connection part is rotated, the first finger connection part connected to the second finger connection part by the roll joints may be rotated together with the second finger connection part, and when the third finger connection part is rotated, the fourth finger connection part connected to the third finger connection part by the roll joints may be rotated together with the third finger connection part.

Motors and speed reducers may be installed in the first finger connection part and the fourth finger connection part so that the first link and the second link are rotated by the motors and the speed reducers, and via the rotation of the first link and the second link, the first finger connection part may be rotated about the second finger connection part and the fourth finger connection part may be rotated about the third finger connection part.

In accordance with another aspect of an embodiment, a robot hand includes a base part, a plurality of finger connection parts provided on the base part such that some of the plurality of finger connection parts are connected to the base part, and a plurality of finger modules respectively connected to the plurality of finger connection parts so as to grasp an object, wherein among the plurality of finger connection parts, finger connection parts connected to the base part are respectively connected to adjacent finger connection parts by roll joints such that each pair of the finger connection parts connected by the roll joints is driven together, the finger connection parts adjacent to the finger connection parts connected to the base part are driven separately from the finger connection parts connected to the base part so that the plurality of finger modules performs symmetrical grasping, and the plurality of finger connection parts connected by the roll joints is driven via connection of pulleys and belts.

The finger connection parts connected to the base part may include a second finger connection part and a third finger connection part, the second finger connection part may be connected to a first finger connection part adjacent to the second finger connection part by the roll joints, and the third finger connection part may be connected to a fourth finger connection part adjacent to the third finger connection part by the roll joints.

The roll joints connecting the second finger connection part and the first finger connection part and the roll joints connecting the third finger connection part and the fourth finger connection part may be formed so as to surround wires in a figure 8 shape.

In order to drive the second finger connection part and the first finger connection part connected by the roll joints and the third finger connection part and the fourth finger connection part connected by the roll joints, motors may be respectively installed in the finger connection parts. A first small pulley may be fixed to the motor installed in the first finger connection part, a second small pulley may be fixed to the motor installed in the second finger connection part, a third small pulley may be fixed to the motor installed in the third finger connection part, a fourth small pulley may be fixed to the motor installed in the fourth finger connection part, and a first large pulley and a second large pulley may be fixed to the second finger connection part and the third finger connection part.

A first belt may be configured to connect the first small pulley, the first large pulley and the third small pulley so as to transmit rotary force among the first small pulley, the first large pulley and the third small pulley, and a second belt may be configured to connect the second small pulley, the second large pulley and the fourth small pulley so as to transmit rotary force among the second small pulley, the second large pulley and the fourth small pulley.

When the second small pulley is rotated by the motor installed in the second finger connection part, the second large pulley connected to the second small pulley by the second belt may be rotated, and when the second large pulley is rotated, the third finger connection part to which the second large pulley is fixed may be rotated. When the third small pulley is rotated by the motor installed in the third finger connection part, the first large pulley connected to the third small pulley by the first belt may be rotated, and when the first large pulley is rotated, the second finger connection part to which the first large pulley is fixed may be rotated.

When the third finger connection part is rotated, the fourth finger connection part connected to the third finger connection part by the roll joints may be rotated together with the third finger connection part, and when the second finger connection part is rotated, the first finger connection part connected to the second finger connection part by the roll joints may be rotated together with the second finger connection part.

When the first small pulley is rotated by the motor installed in the first finger connection part, the first finger connection part may be rotated about the second finger connection part, and when the fourth small pulley is rotated by the motor installed in the fourth finger connection part, the fourth finger connection part may be rotated about the third finger connection part.

In accordance with a further aspect of an embodiment, a robot hand includes a base part, a plurality of finger connection parts provided on the base part such that some of the plurality of finger connection parts are connected to the base part, and a plurality of finger modules respectively connected to the plurality of finger connection parts so as to grasp an object, wherein among the plurality of finger connection parts, finger connection parts connected to the base part are respectively connected to adjacent finger connection parts by roll joints such that each pair of the finger connection parts connected by the roll joints is driven together, the finger connection parts adjacent to the finger connection parts connected to the base part are driven separately from the finger connection parts connected to the base part so that the plurality of finger modules performs symmetrical grasping, and the plurality of finger connection parts connected by the roll joints is driven via connection of gears.

The finger connection parts connected to the base part may include a second finger connection part and a third finger connection part, the second finger connection part may be connected to a first finger connection part adjacent to the second finger connection part by the roll joints, and the third finger connection part may be connected to a fourth finger connection part adjacent to the third finger connection part by the roll joints.

The roll joints connecting the second finger connection part and the first finger connection part and the roll joints connecting the third finger connection part and the fourth finger connection part may be formed so as to surround wires in a figure 8 shape.

The gears may include spur gears.

In order to drive the second finger connection part and the first finger connection part connected by the roll joints and the third finger connection part and the fourth finger connection part connected by the roll joints, motors may be respectively installed in the finger connection parts. A first small gear may be fixed to the motor installed in the first finger connection part, a second small gear may be fixed to the motor installed in the second finger connection part, a third small gear may be fixed to the motor installed in the third finger connection part, a fourth small gear may be fixed to the motor installed in the fourth finger connection part, and a first large gear and a second large gear may be fixed to the second finger connection part and the third finger connection part.

When the second small gear is rotated by the motor installed in the second finger connection part, the second large gear may be rotated by the rotation of the second small gear, and when the second large gear is rotated, the third finger connection part to which the second large gear is fixed may be rotated. When the third small gear is rotated by the motor installed in the third finger connection part, the first large gear may be rotated by the rotation of the third small gear, and when the first large gear is rotated, the second finger connection part to which the first large gear is fixed may be rotated.

When the third finger connection part is rotated, the fourth finger connection part connected to the third finger connection part by the roll joints may be rotated together with the third finger connection part, and when the second finger connection part is rotated, the first finger connection part connected to the second finger connection part by the roll joints may be rotated together with the second finger connection part.

When the first small gear is rotated by the motor installed in the first finger connection part, the first finger connection part may be rotated about the second finger connection part, and when the fourth small gear is rotated by the motor installed in the fourth finger connection part, the fourth finger connection part may be rotated about the third finger connection part.

The gears may include internal gears.

In order to drive the second finger connection part and the first finger connection part connected by the roll joints and the third finger connection part and the fourth finger connection part connected by the roll joints, motors may be respectively installed in the finger connection parts. A first small gear may be fixed to the motor installed in the first finger connection part, a second small gear may be fixed to the motor installed in the second finger connection part, a third small gear may be fixed to the motor installed in the third finger connection part, a fourth small gear may be fixed to the motor installed in the fourth finger connection part, and a first internal gear and a second internal gear may be fixed to the second finger connection part and the third finger connection part.

When the second small gear is rotated by the motor installed in the second finger connection part, the second internal gear may be rotated by the rotation of the second small gear, and when the second internal gear is rotated, the third finger connection part to which the second large gear is fixed may be rotated. When the third small gear is rotated by the motor installed in the third finger connection part, the first internal gear may be rotated by the rotation of the third small gear, and when the first internal gear is rotated, the second finger connection part to which the first large gear is fixed may be rotated.

When the third finger connection part is rotated, the fourth finger connection part connected to the third finger connection part by the roll joints may be rotated together with the third finger connection part, and when the second finger connection part is rotated, the first finger connection part connected to the second finger connection part by the roll joints may be rotated together with the second finger connection part.

When the first small gear is rotated by the motor installed in the first finger connection part, the first finger connection part may be rotated about the second finger connection part, and when the fourth small gear is rotated by the motor installed in the fourth finger connection part, the fourth finger connection part may be rotated about the third finger connection part.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
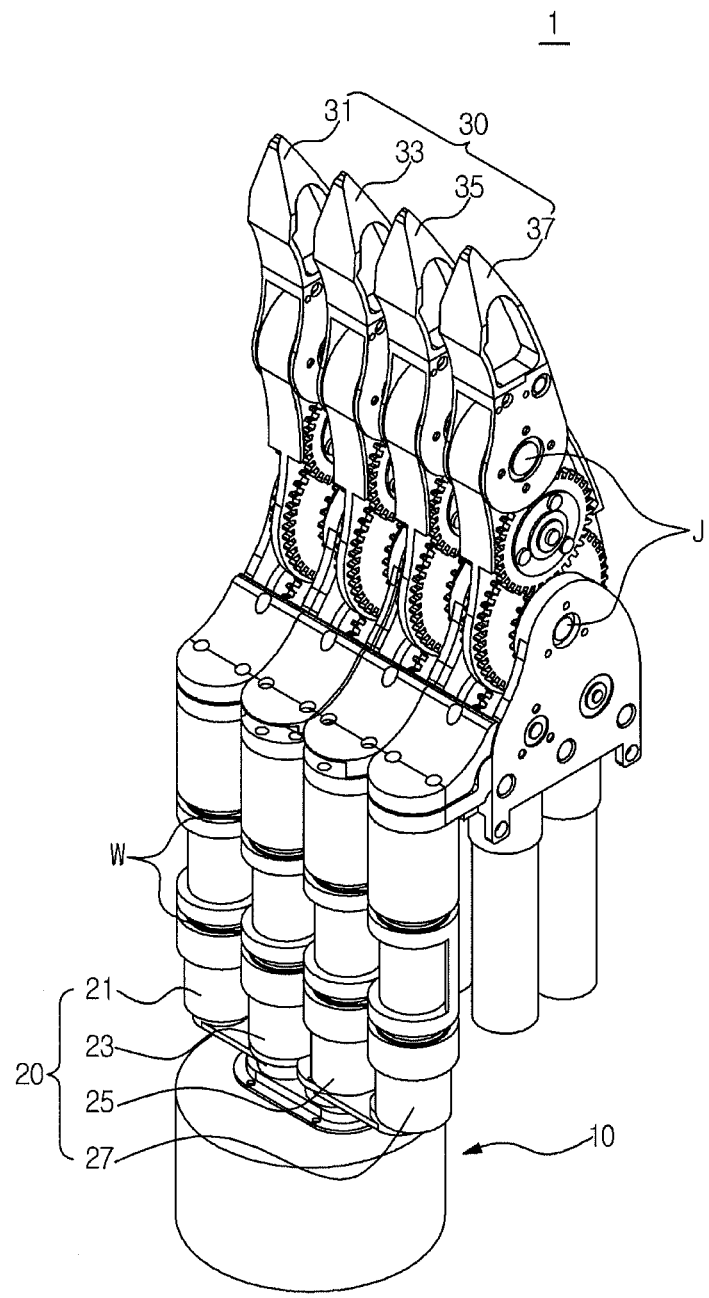
FIG. 1 is a perspective view illustrating a robot hand in accordance with an embodiment.

Reference will now be made in detail to embodiments, examples of which are illustrated in the accompanying drawings, wherein like reference numerals refer to like elements throughout.

FIG. 1 is a perspective view illustrating a robot hand in accordance with an embodiment.

As shown in FIG. 1, the robot hand 1 includes a base part 10, a plurality of finger connection parts 20 provided on the base part 10 such that some of the plurality of finger connection parts 20 are connected to the base part 10, and a plurality of finger modules 30 respectively connected to the plurality of finger connection parts 20 so as to grasp an object.

As shown in FIG. 1, the base part 10 corresponds to a human wrist, and the plurality of finger connection parts 20 and the plurality of finger modules 30 are provided on the base part 10.

The plurality of finger connection parts 20 provided on the base part 10 includes a first finger connection part 21, a second finger connection part 23, a third finger connection part 25 and a fourth finger connection part 27.

Although FIG. 1 illustrates the plurality of finger connection parts 20 as including the four finger connection parts 21, 23, 25 and 27, the number of the plurality of finger connection parts 20 is not limited thereto.

As shown in FIG. 1, among the plurality of finger connection parts 20 provided on the base part 10, the second finger connection part 23 and the third finger connection part 25 are directly connected to the base part 10.

The first finger connection part 21 adjacent to the second finger connection part 23 directly connected to the base part 10 is not directly connected to the base part 10, but is connected to the second finger connection part 23 by roll joints.

The fourth finger connection part 27 adjacent to the third finger connection part 25 directly connected to the base part 10 is not directly connected to the base part 10, but is connected to the third finger connection part 25 by roll joints.

The second finger connection part 23 and the first finger connection part 21 are connected by the roll joints and the third finger connection part 25 and the fourth finger connection part 27 are connected by the roll joints, thereby allowing rolling motions to be performed.

Figure 8:
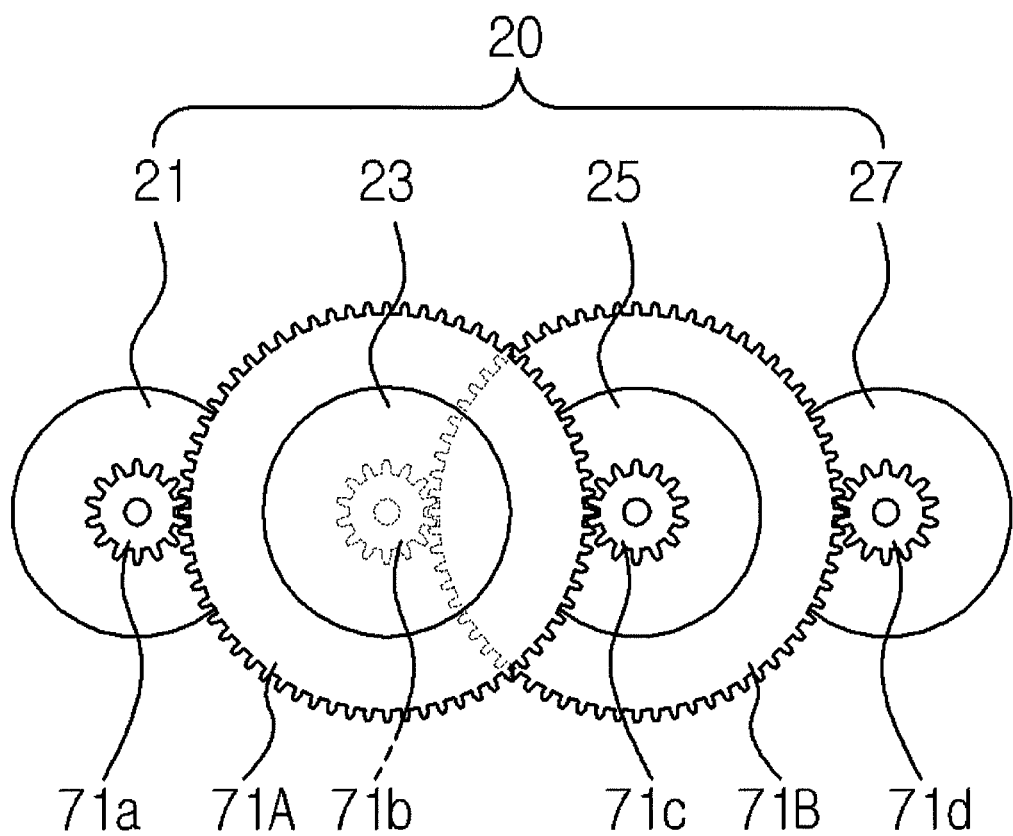
FIG. 8 is a view schematically illustrating the robot hand in accordance with an embodiment in which the plurality of fingers is driven via the connection of the spur gears.

The roll joints to perform rolling motions are formed so as to surround wires W in a figure 8 shape, as shown in FIG. 1.

The roll joints surrounding the wires W in the figure 8 shape maintain closed states between the second finger connection part 23 and the first finger connection part 21 and between the third finger connection part 25 and the fourth finger connection part 27 without widening.

Aside from surrounding the wires W in the figure 8 shape, the roll joints may formed by gears (not shown) or through various other methods.

Using the roll joints, the plurality of finger connection parts 20 may be formed in a simpler configuration and be more precisely driven.

The first finger connection part 21 connected to the second finger connection part 23 by the roll joints is controlled so as to perform a rolling motion, and is thus driven together with driving of the second finger connection part 23 under the condition that the first finger connection part 21 is closely adhered to the second finger connection part 23 by the wires W.

The fourth finger connection part 27 connected to the third finger connection part 25 by the roll joints is also controlled so as to perform a rolling motion, and is thus driven together with driving of the third finger connection part 25 under the condition that the fourth finger connection part 27 is closely adhered to the third finger connection part 25 by the wires W.

Since the second finger connection part 23 and the first finger connection part 21 are connected by the roll joints and the third finger connection part 25 and the fourth finger connection part 27 are connected by the roll joints, the first finger connection part 21 is driven together with the second finger connection part 23 when the second finger connection part 23 is driven and the fourth finger connection part 27 is driven together with the third finger connection part 25 when the third finger connection part 25 is driven. Further, the first finger connection part 21 may be driven separately from the second finger connection part 23 and the fourth finger connection part 27 may be driven separately from the third finger connection part 25.

As shown in FIG. 1, the plurality of finger modules 30 is respectively connected to the plurality of finger connection parts 20 so as to grasp an object.

The plurality of finger modules 30 includes a first finger module 31, a second finger module 33, a third finger module 35 and a fourth finger module 37.

Although FIG. 1 illustrates the plurality of finger modules 30 as including the four finger modules 31, 33, 35 and 37, the number of the plurality of finger modules 30 respectively connected to the plurality of finger connection parts 20 is varied according to the number of the plurality of finger connection parts 20.

Further, although FIG. 1 illustrate the plurality of finger modules 30 as being respectively connected by two joints J so as to have 2 degrees of freedom, the structure of the plurality of finger modules 30 is not limited thereto and may be configured in various shapes so long as such shapes enable an object to be grasped.

The plurality of finger modules 30 respectively connected to the plurality of finger connection parts 20 is rotated symmetrically so as to grasp an arbitrary object, and, and grasps the object when the plurality of finger modules 30 is rotated and thus form symmetry.

Hereinafter, various configurations to drive the plurality of finger connection parts 20 will be described.

Figure 3:
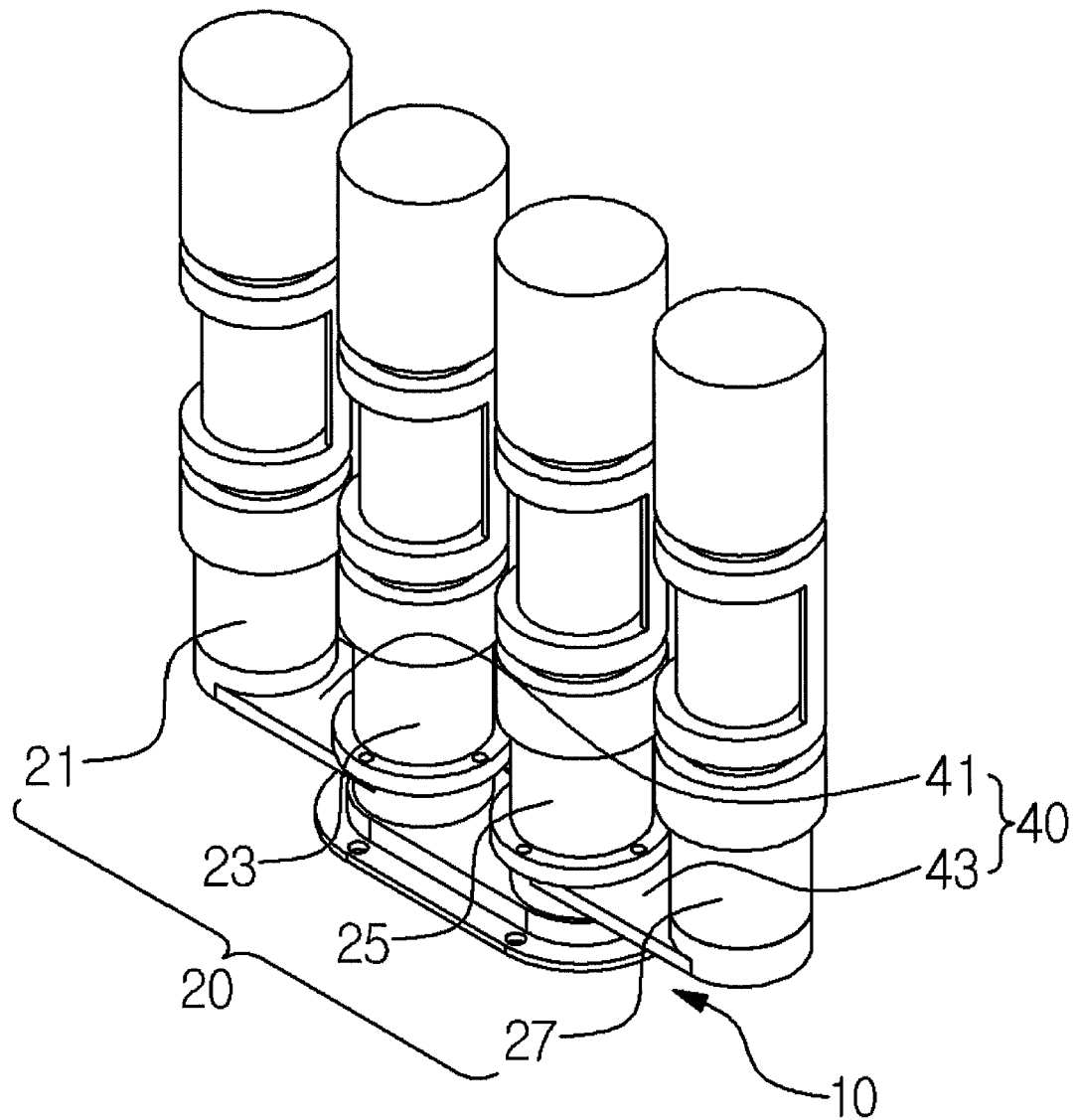
FIG. 3 is a perspective view illustrating a robot hand in accordance with an embodiment in which a plurality of fingers connection parts is driven via connection of links.
Figure 4:
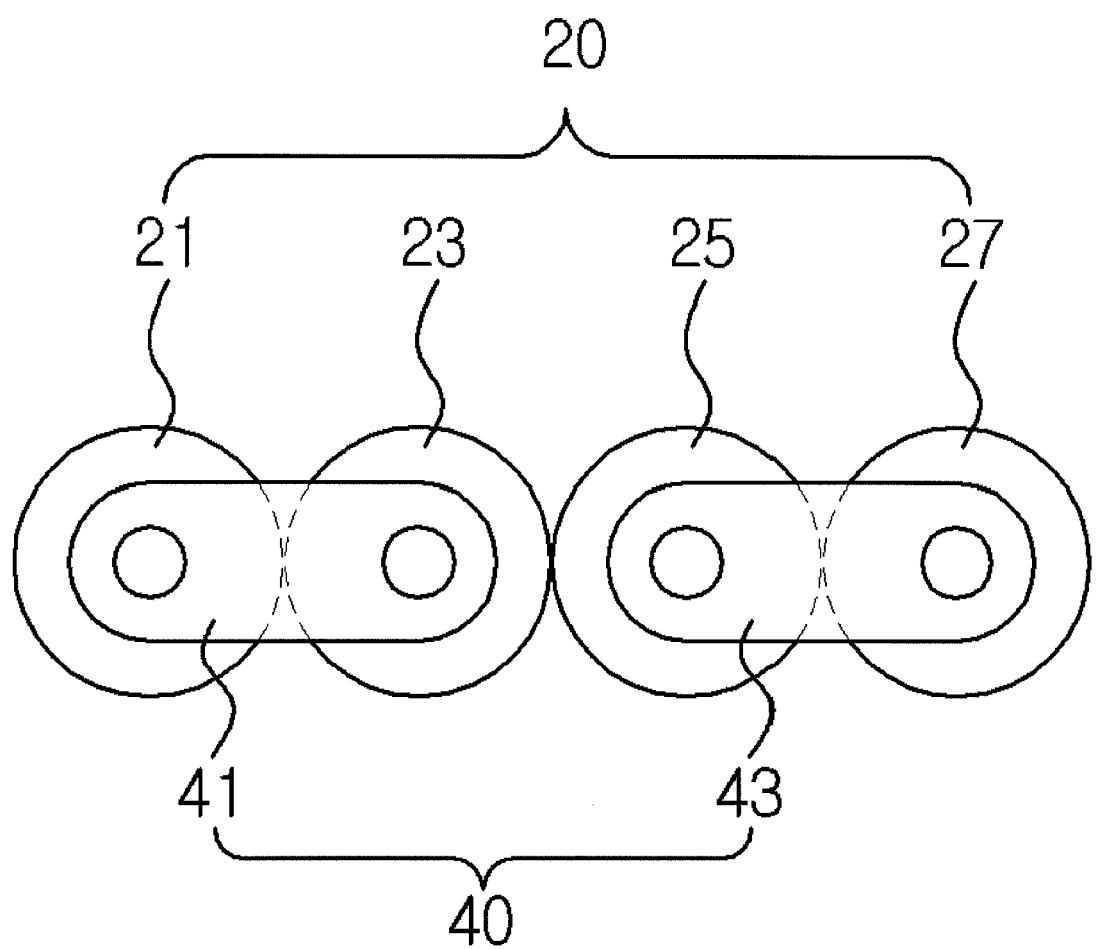
FIG. 4 is a view schematically illustrating the robot hand in accordance with an embodiment in which the plurality of fingers connection parts is driven via the connection of the links.

As shown in FIGS. 3 and 4, the plurality of finger connection parts 20 connected by the roll joints is driven via connection of links 40.

Motors (not shown) and speed reducers (not shown) are respectively installed in the plurality of finger connection parts 20 driven via the connection of the links 40.

In order to drive the second finger connection part 23 and the first finger connection part 21 connected by the roll joints and the third connection part 25 and the fourth finger connection part 27 connected by the roll joints, the second finger connection part 23 and the first finger connection part 21 are connected by a first link 41 provided on the lower portions of the second finger connection part 23 and the first finger connection part 21, and the third finger connection part 25 and the fourth finger connection part 27 are connected by a second link 43 provided on the lower portions of the third finger connection part 25 and the fourth finger connection part 27.

Hereinafter, a process of performing symmetrical grasping using the plurality of finger connection parts 20 through the links 40 will be described in more detail.

First, the second finger connection part 23 and the third finger connection part 25 of the plurality of finger connection parts 20 are rotated with respect to the base part 10 by the motors (not shown) and the speed reducers (not shown) respectively installed on the second finger connection part 23 and the third finger connection part 25.

When the second finger connection part 23 is rotated with respect to the base part 10, the first finger connection part 21 connected to the second finger connection part 23 by the roll joints and controlled to perform the rolling motion is rotated together with the second finger connection part 23.

In the same manner, when the third finger connection part 25 is rotated with respect to the base part 10, the first fourth connection part 27 connected to the third finger connection part 25 by the roll joints and controlled to perform the rolling motion is rotated together with the third finger connection part 25.

Figure 2:
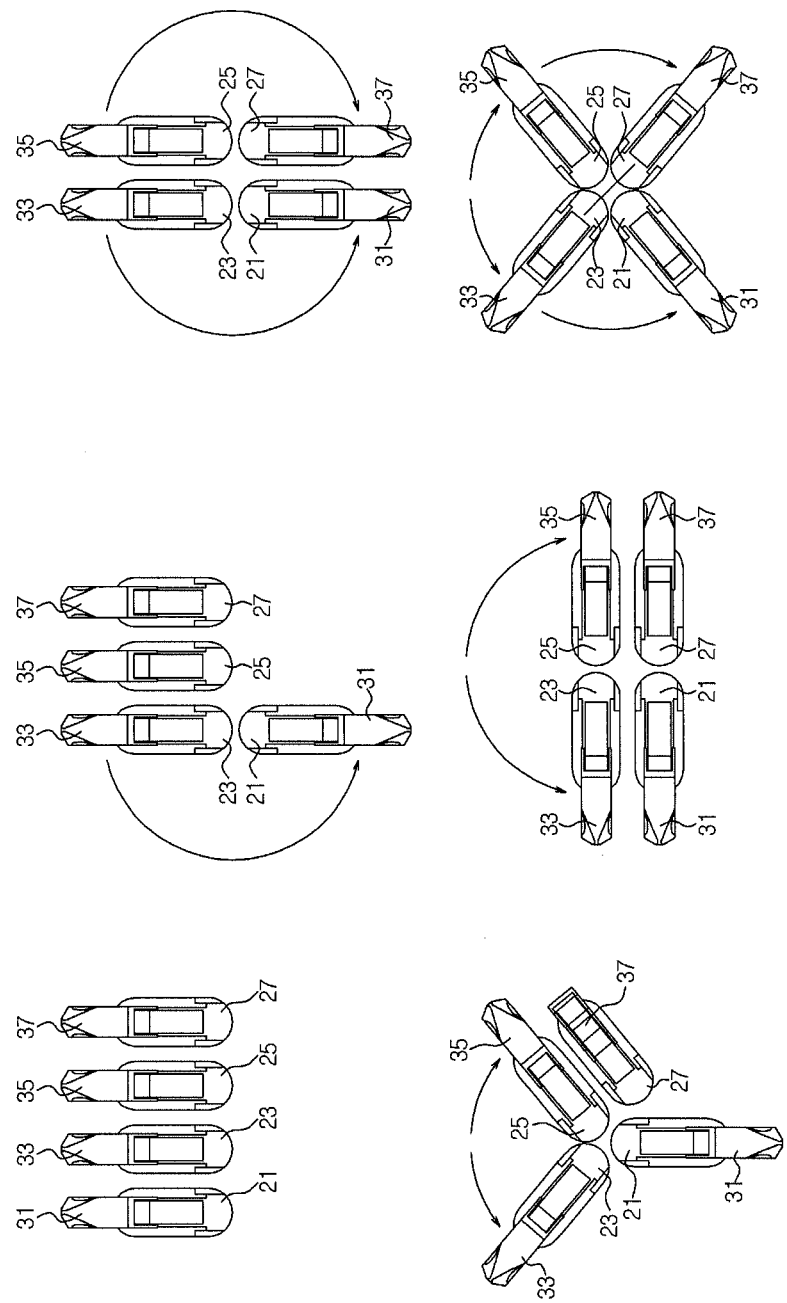
FIG. 2 is a view schematically illustrating various symmetrical grasping strategies of the robot hand in accordance with an embodiment.

When the second finger connection part 23 and the third finger connection part 25 are rotated with respect to the base part 10 by the motors (not shown) and the speed reducers (not shown) respectively installed in the second finger connection part 23 and the third finger connection part 25, the first finger connection part 21 and the fourth connection part 27 respectively connected to the second finger connection part 23 and the third finger connection part 25 by the roll joints are rotated together with the second finger connection part 23 and the third finger connection part 25, and thus the plurality of finger connection parts 20 forms a symmetrical structure so as to grasp an object, as shown in FIG. 2.

When the plurality of finger connection parts 20 forms the symmetrical structure, the object is grasped by the plurality of finger modules 30 respectively connected to the plurality of finger connection parts 20.

If the object is incapable of being grasped through the above symmetrical structure formed by the rotation of the second finger connection part 23 and the third finger connection part 25, the first finger connection part 21 and the fourth finger connection part 27 need to be separately rotated to form another symmetrical structure so as to grasp the object.

In order to form another symmetrical structure by separately rotating the first finger connection part 21 and the fourth finger connection part 27, the first link 41 is rotated by the motor (not shown) and the speed reducer (not shown) installed in the first finger connection part 21, and the second link 43 is rotated by the motor (not shown) and the speed reducer (not shown) installed in the fourth finger connection part 27.

When the first link 41 is rotated, the first finger connection part 21 is rotated about the second finger connection part 23, and when the second link 43 is rotated, the fourth finger connection part 27 is rotated about the third finger connection part 25. That is, the first finger connection part 21 and the fourth finger connection part 27 are separately rotated.

When the first finger connection part 21 and the fourth finger connection part 27 are separately rotated and thus the plurality of finger connection parts 20 forms a new symmetrical structure, the object is grasped by the plurality of finger modules 30 respectively connected to the plurality of finger connection parts 20.

The above configuration in which the links 40 are connected is relatively simple, thereby allowing the robot hand 1 to have a simpler configuration.

Figure 5:
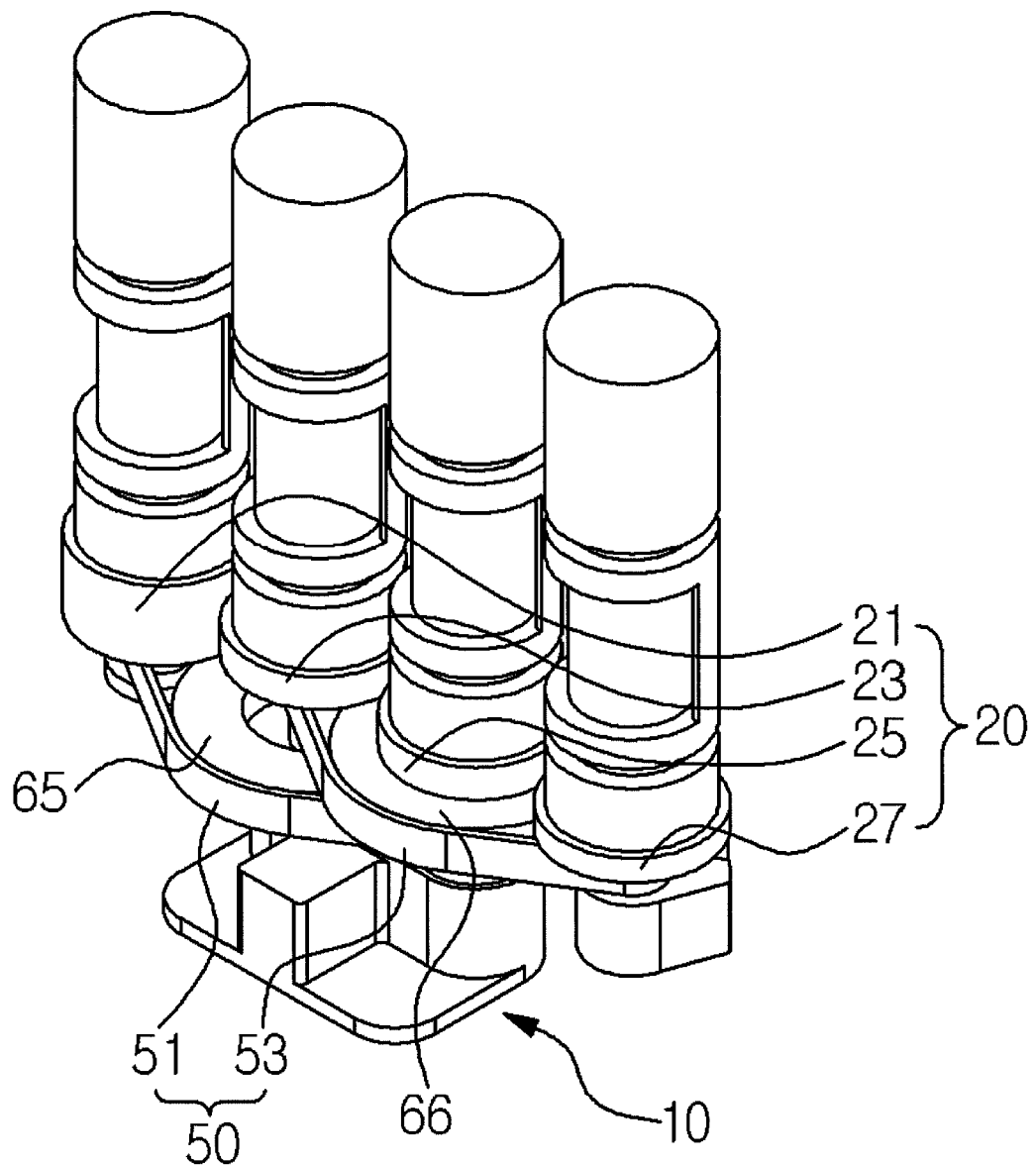
FIG. 5 is a perspective view illustrating a robot hand in accordance with another embodiment in which a plurality of fingers is driven via connection of pulleys and belts.
Figure 6:
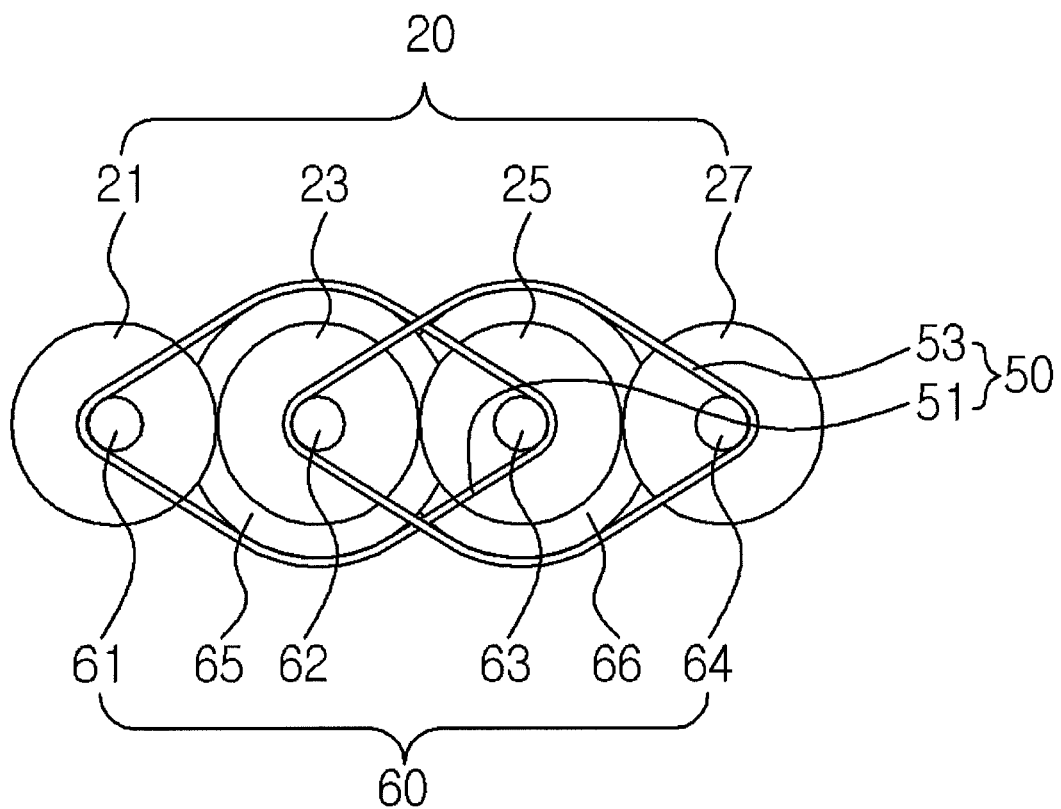
FIG. 6 is a view schematically illustrating the robot hand in accordance with an embodiment in which the plurality of fingers is driven via the connection of the pulleys and the belts.

As shown in FIGS. 5 and 6, the plurality of finger connection parts 20 connected by the roll joints is driven via connection of pulleys 60 and belts 50.

Motors (not shown) are respectively installed in the plurality of finger connection parts 20 driven via the connection of the pulleys 60 and the belts 50.

In order to drive the second finger connection part 23 and the first finger connection part 21 connected by the roll joints and the third connection part 25 and the fourth finger connection part 27 connected by the roll joints, a first small pulley 61 is fixed to the motor (not shown) installed in the first finger connection part 21, a second small pulley 62 is fixed to the motor (not shown) installed in the second finger connection part 23, a third small pulley 63 is fixed to the motor (not shown) installed in the third finger connection part 25, a fourth small pulley 64 is fixed to the motor (not shown) installed in the fourth finger connection part 27, and a first large pulley 65 and a second large pulley 66 are fixed to the second finger connection part 23 and the third finger connection part 25.

Further, a first belt 51 is configured to connect the first small pulley 61, the first large pulley 65, and the third small pulley 63 so as to transmit rotary force, and a second belt 53 is configured to connect the second small pulley 62, the second large pulley 66, and the fourth small pulley 64 so as to transmit rotary force.

Hereinafter, a process of performing symmetrical grasping using the plurality of finger connection parts 20 through the pulleys 60 and the belts 50 will be described in more detail.

First, when the second small pulley 62 is rotated by the motor (not shown) installed in the second finger connection part 23, rotary force of the second small pulley 62 is transmitted to the second large pulley 66 connected to the second small pulley 62 by the second belt 53 and the second large pulley 66 is rotated at a reduced rotational amount by the second belt 53.

When the second large pulley 66 is rotated at the reduced rotational amount, the third finger connection part 25 to which the second large pulley 66 is fixed is rotated at the reduced rotational amount.

In the same manner, when the third small pulley 63 is rotated by the motor (not shown) installed in the third finger connection part 25, rotary force of the third small pulley 63 is transmitted to the first large pulley 65 connected to the third small pulley 63 by the first belt 51 and the first large pulley 65 is rotated at a reduced rotational amount by the first belt 51.

When the first large pulley 65 is rotated at the reduced rotational amount, the second finger connection part 23 to which the first large pulley 65 is fixed is rotated at the reduced rotational amount.

As described above, when the third finger connection part 25 is rotated, the fourth finger connection part 27 connected to the third finger connection part 25 by the roll joints is rotated together with the third finger connection part 25, and when the second finger connection part 23 is rotated, the first finger connection part 21 connected to the second finger connection part 23 by the roll joints is rotated together with the second finger connection part 23, and thus the plurality of finger connection parts 20 forms a symmetrical structure so as to grasp an object, as shown in FIG. 2.

When the plurality of finger connection parts 20 forms the symmetrical structure, the object is grasped by the plurality of finger modules 30 respectively connected to the plurality of finger connection parts 20.

If the object is incapable of being grasped through the above symmetrical structure formed by the rotation of the second finger connection part 23 and the third finger connection part 25, the first finger connection part 21 and the fourth finger connection part 27 need to be separately rotated to form another symmetrical structure so as to grasp the object.

In order to form another symmetrical structure by separately rotating the first finger connection part 21 and the fourth finger connection part 27, when the first small pulley 61 is rotated by the motor (not shown) installed in the first finger connection part 21, the first finger connection part 21 is rotated about the second finger connection part 23 at a reduced rotational amount by the first belt 51, and when the fourth small pulley 64 is rotated by the motor (not shown) installed in the fourth finger connection part 27, the fourth finger connection part 27 is rotated about the third finger connection part 25 at a reduced rotational amount by the second belt 53, thereby allowing the first finger connection part 21 and the fourth finger connection part 27 to be separately rotated.

When the first finger connection part 21 and the fourth finger connection part 27 are separately rotated and thus the plurality of finger connection parts 20 forms a new symmetrical structure, the object is grasped by the plurality of finger modules 30 respectively connected to the plurality of finger connection parts 20.

The above configuration in which the pulleys 60 and the belts 50 are connected has a speed reducing function and does not require any separate speed reducer, and has little backlash and thus eliminates the need for any backlash reducing member.

Figure 7:
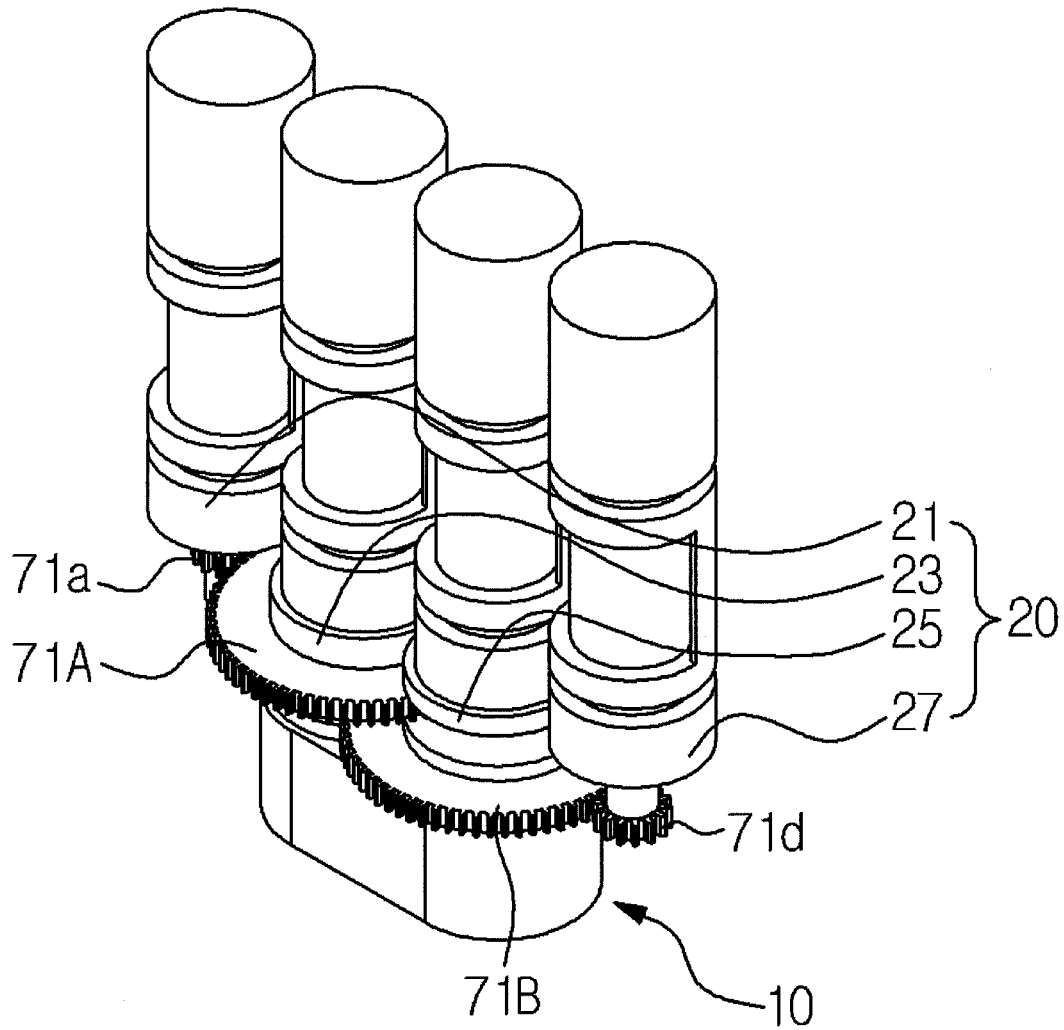
FIG. 7 is a perspective view illustrating a robot hand in accordance with another embodiment in which a plurality of fingers is driven via connection of spur gears.

As shown in FIGS. 7 and 8, the plurality of finger connection parts 20 connected by the roll joints is driven via connection of spur gears 71.

Motors (not shown) are respectively installed in the plurality of finger connection parts 20 driven via the connection of the spur gears 71.

In order to drive the second finger connection part 23 and the first finger connection part 21 connected by the roll joints and the third connection part 25 and the fourth finger connection part 27 connected by the roll joints, a first small gear 71a is fixed to the motor (not shown) installed in the first finger connection part 21, a second small gear 71b is fixed to the motor (not shown) installed in the second finger connection part 23, a third small gear 71c is fixed to the motor (not shown) installed in the third finger connection part 25, a fourth small gear 71d is fixed to the motor (not shown) installed in the fourth finger connection part 27, and a first large gear 71A and a second large gear 71B are fixed to the second finger connection part 23 and the third finger connection part 25.

Hereinafter, a process of performing symmetrical grasping using the plurality of finger connection parts 20 through the spur gears 71 will be described in more detail.

First, when the second small gear 71b is rotated by the motor (not shown) installed in the second finger connection part 23, the second large gear 71B engaged with the second small gear 71b is rotated at a reduced rotational amount by the rotation of the second small gear 71b.

When the second large gear 71B is rotated at the reduced rotational amount, the third finger connection part 25 to which the second large gear 71B is fixed is rotated at the reduced rotational amount.

In the same manner, when the third small gear 71c is rotated by the motor (not shown) installed in the third finger connection part 25, the first large gear 71A engaged with the third small gear 71c is rotated at a reduced rotational amount by the rotation of the third small gear 71c.

When the first large gear 71A is rotated at the reduced rotational amount, the second finger connection part 23 to which the first large gear 71A is fixed is rotated at the reduced rotational amount.

As described above, when the third finger connection part 25 is rotated, the fourth finger connection part 27 connected to the third finger connection part 25 by the roll joints is rotated together with the third finger connection part 25, and when the second finger connection part 23 is rotated, the first finger connection part 21 connected to the second finger connection part 23 by the roll joints is rotated together with the second finger connection part 23, and thus the plurality of finger connection parts 20 forms a symmetrical structure so as to grasp an object, as shown in FIG. 2.

When the plurality of finger connection parts 20 forms the symmetrical structure, the object is grasped by the plurality of finger modules 30 respectively connected to the plurality of finger connection parts 20.

If the object is incapable of being grasped through the above symmetrical structure formed by the rotation of the second finger connection part 23 and the third finger connection part 25, the first finger connection part 21 and the fourth finger connection part 27 need to be separately rotated to form another symmetrical structure so as to grasp the object.

In order to form another symmetrical structure by separately rotating the first finger connection part 21 and the fourth finger connection part 27, when the first small gear 71a is rotated by the motor (not shown) installed in the first finger connection part 21, the first finger connection part 21 is rotated about the second finger connection part 23 at a reduced rotational amount by the first large gear 71A, and when the fourth small gear 71d is rotated by the motor (not shown) installed in the fourth finger connection part 27, the fourth finger connection part 27 is rotated about the third finger connection part 25 at a reduced rotational amount by the second large gear 71B, thereby allowing the first finger connection part 21 and the fourth finger connection part 27 to be separately rotated.

When the first finger connection part 21 and the fourth finger connection part 27 are separately rotated and thus the plurality of finger connection parts 20 forms a new symmetrical structure, the object is grasped by the plurality of finger modules 30 respectively connected to the plurality of finger connection parts 20.

The above configuration in which the spur gears 71 are connected is relatively simple, thereby allowing the robot hand 1 to have a simpler configuration.

Figure 9:
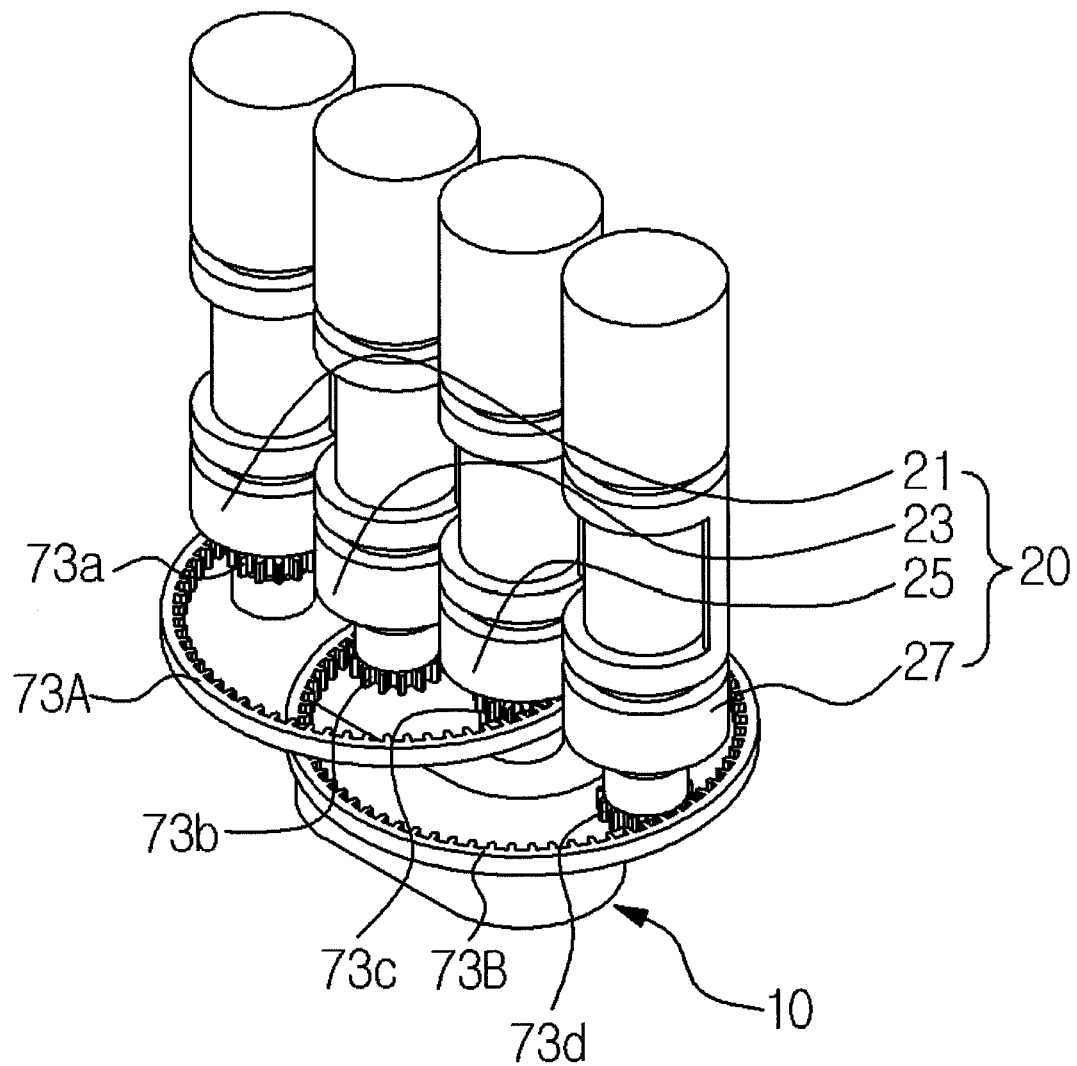
FIG. 9 is a perspective view illustrating a robot hand in accordance with another embodiment in which a plurality of fingers is driven via connection of internal gears.
Figure 10:
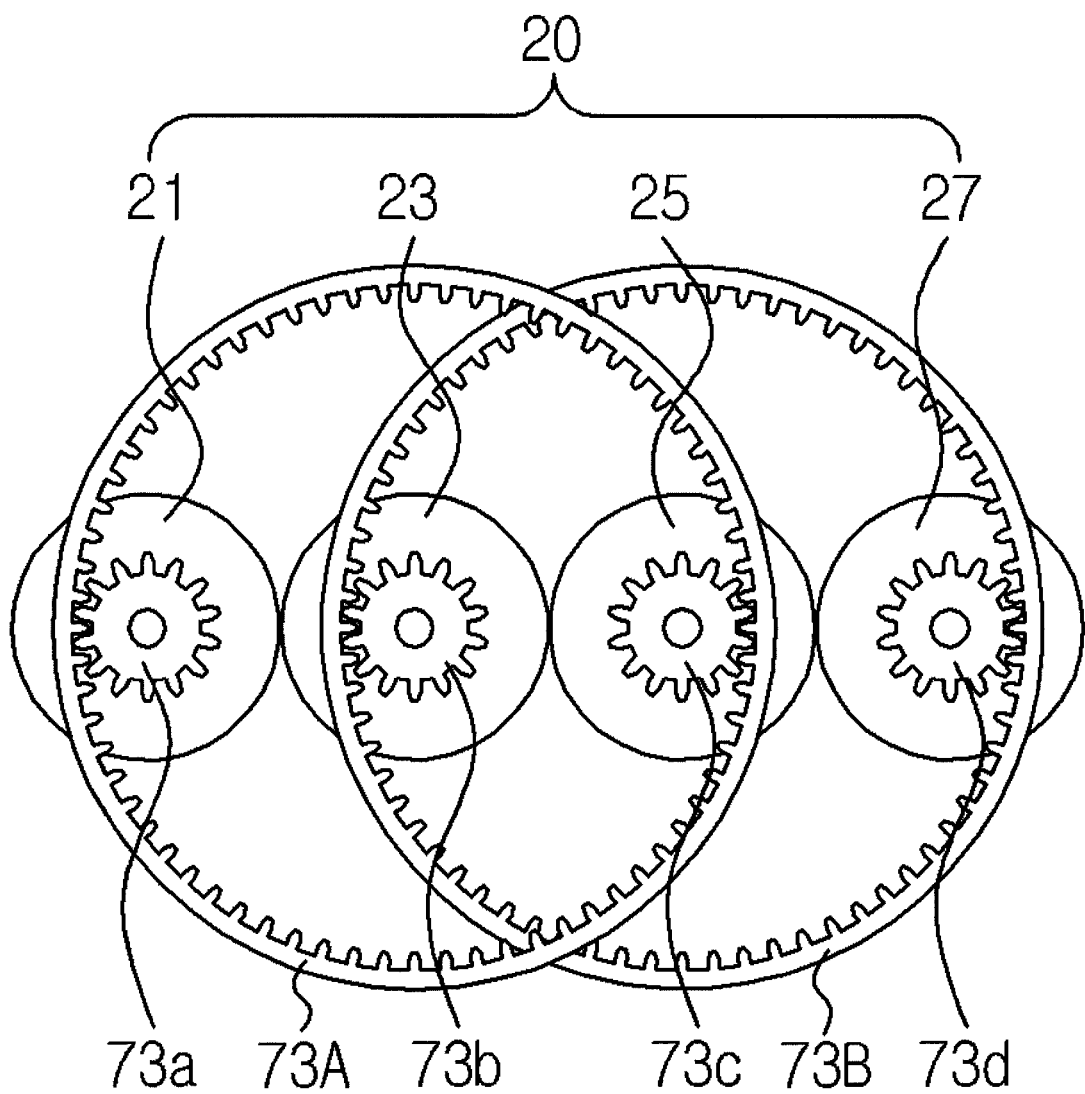
FIG. 10 is a view schematically illustrating the robot hand in accordance with an embodiment in which the plurality of fingers is driven via the connection of the internal gears.

As shown in FIGS. 9 and 10, the plurality of finger connection parts 20 connected by the roll joints is driven via connection of internal gears 73.

Motors (not shown) are respectively installed in the plurality of finger connection parts 20 driven via the connection of the internal gears 73.

In order to drive the second finger connection part 23 and the first finger connection part 21 connected by the roll joints and the third connection part 25 and the fourth finger connection part 27 connected by the roll joints, a first small gear 73a is fixed to the motor (not shown) installed in the first finger connection part 21, a second small gear 73b is fixed to the motor (not shown) installed in the second finger connection part 23, a third small gear 73c is fixed to the motor (not shown) installed in the third finger connection part 25, a fourth small gear 73d is fixed to the motor (not shown) installed in the fourth finger connection part 27, and a first internal gear 73A and a second internal gear 73B are fixed to the second finger connection part 23 and the third finger connection part 25.

Hereinafter, a process of performing symmetrical grasping using the plurality of finger connection parts 20 through the internal gears 73 will be described in more detail.

First, when the second small gear 73b is rotated by the motor (not shown) installed in the second finger connection part 23, the second internal gear 73B engaged with the second small gear 73b is rotated at a reduced rotational amount by the rotation of the second small gear 73b.

When the second internal gear 73B is rotated at the reduced rotational amount, the third finger connection part 25 to which the second internal gear 73B is fixed is rotated at the reduced rotational amount.

In the same manner, when the third small gear 73c is rotated by the motor (not shown) installed in the third finger connection part 25, the first internal gear 73A engaged with the third small gear 73c is rotated at a reduced rotational amount by the rotation of the third small gear 73c.

When the first internal gear 73A is rotated at the reduced rotational amount, the second finger connection part 23 to which the first internal gear 73A is fixed is rotated at the reduced rotational amount.

As described above, when the third finger connection part 25 is rotated, the fourth finger connection part 27 connected to the third finger connection part 25 by the roll joints is rotated together with the third finger connection part 25, and when the second finger connection part 23 is rotated, the first finger connection part 21 connected to the second finger connection part 23 by the roll joints is rotated together with the second finger connection part 23, and thus the plurality of finger connection parts 20 forms a symmetrical structure so as to grasp an object, as shown in FIG. 2.

When the plurality of finger connection parts 20 forms the symmetrical structure, the object is grasped by the plurality of finger modules 30 respectively connected to the plurality of finger connection parts 20.

If the object is incapable of being grasped through the above symmetrical structure formed by the rotation of the second finger connection part 23 and the third finger connection part 25, the first finger connection part 21 and the fourth finger connection part 27 need to be separately rotated to form another symmetrical structure so as to grasp the object.

In order to form another symmetrical structure by separately rotating the first finger connection part 21 and the fourth finger connection part 27, when the first small gear 73a is rotated by the motor (not shown) installed in the first finger connection part 21, the first finger connection part 21 is rotated about the second finger connection part 23 at a reduced rotational amount by the first internal gear 73A, and when the fourth small pulley 73d is rotated by the motor (not shown) installed in the fourth finger connection part 27, the fourth finger connection part 27 is rotated about the third finger connection part 25 at a reduced rotational amount by the second internal gear 71B, thereby allowing the first finger connection part 21 and the fourth finger connection part 27 to be separately rotated.

When the first finger connection part 21 and the fourth finger connection part 27 are separately rotated and thus the plurality of finger connection parts 20 forms a new symmetrical structure, the object is grasped by the plurality of finger modules 30 respectively connected to the plurality of finger connection parts 20.

The above configuration in which the internal gears 73 are connected is relatively simple, thereby allowing the robot hand 1 to have a simpler configuration.

As is apparent from the above description, a robot hand in accordance with an embodiment has both an arbitrary object grasping function in the same manner as a human hand and a high precision and stable grasping function in the same manner as an industrial gripper through drive of a plurality finger connection parts using roll joints.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot hand comprising:
a base part;
a plurality of finger connection parts provided on the base part such that some of the plurality of finger connection parts are connected to the base part; and
a plurality of finger modules respectively connected to the plurality of finger connection parts so as to grasp an object, wherein:
among the plurality of finger connection parts, finger connection parts connected to the base part are respectively connected to adjacent finger connection parts by roll joints to thereby provide pairs of finger connection parts with each pair including a finger connection part connected to the base part and an adjacent finger connection part, and such that,
for each of the pairs, when the finger connection part connected to the base part of the respective pair is driven, the adjacent finger connection part of the respective pair is rotated together with the finger connection part connected to the base part of the respective pair; and
the finger connection parts adjacent to the finger connection parts connected to the base part are drivable separately from the finger connection parts connected to the base part so that the plurality of finger modules performs symmetrical grasping.

2. The robot hand according to claim 1, wherein:
the finger connection parts connected to the base part include a second finger connection part and a third finger connection part;
the roll joints include a first roll joint and a second roll joint; and
the second finger connection part is connected to a first finger connection part adjacent to the second finger connection part by the first roll joint and the third finger connection part is connected to a fourth finger connection part adjacent to the third finger connection part by the second roll joint.

3. The robot hand according to claim 2, wherein the first and second roll joints are formed so as to surround wires in a figure 8 shape.

4. The robot hand according to claim 1, wherein
the finger connection parts connected to the base part are directly connected to the base part, and
said adjacent finger connection parts are not directly connected to the base part.

5. A robot hand comprising:
a base part;
a plurality of finger connection parts provided on the base part such that some of the plurality of finger connection parts are connected to the base part; and
a plurality of finger modules respectively connected to the plurality of finger connection parts so as to grasp an object, wherein:
among the plurality of finger connection parts, finger connection parts connected to the base part are respectively connected to adjacent finger connection parts by roll joints to thereby provide pairs of finger connection parts with each pair including a finger connection part connected to the base part and an adjacent finger connection part, and such that,
for each of the pairs, when the finger connection part connected to the base part of the respective pair is driven, the adjacent finger connection part of the respective pair is rotated together with the finger connection part connected to the base part of the respective pair;
the finger connection parts adjacent to the finger connection parts connected to the base part are drivable separately from the finger connection parts connected to the base part so that the plurality of finger modules performs symmetrical grasping; and
the plurality of finger connection parts connected by the roll joints is driven via connection of links.

6. The robot hand according to claim 5, wherein:
the finger connection parts connected to the base part include a second finger connection part and a third finger connection part;

the roll joints include a first roll joint and a second roll joint; and the second finger connection part is connected to a first finger connection part adjacent to the second finger connection part by the first roll joint and the third finger connection part is connected to a fourth finger connection part adjacent to the third finger connection part by the second roll joint.

7. The robot hand according to claim 6, wherein the first and second roll joints are formed so as to surround wires in a figure 8 shape.

8. The robot hand according to claim 7, wherein, in order to drive the second finger connection part and the first finger connection part connected by the first roll joint and the third finger connection part and the fourth finger connection part connected by the second roll joint, the second finger connection part and the first finger connection part are connected by a first link and the third finger connection part and the fourth finger connection part are connected by a second link.

9. The robot hand according to claim 8, wherein:
motors and speed reducers are installed in the second finger connection part and the third finger connection part so that the second finger connection part and the third finger connection part are rotated with respect to the base part by the motors and the speed reducers;
when the second finger connection part is rotated, the first finger connection part connected to the second finger connection part by the first roll joint is rotated together with the second finger connection part; and
when the third finger connection part is rotated, the fourth finger connection part connected to the third finger connection part by the second roll joint is rotated together with the third finger connection part.

10. The robot hand according to claim 9, wherein:
motors and speed reducers are installed in the first finger connection part and the fourth finger connection part so that the first link and the second link are rotated by the motors and the speed reducers; and
via the rotation of the first link and the second link, the first finger connection part is rotated about the second finger connection part and the fourth finger connection part is rotated about the third finger connection part.

11. A robot hand comprising:
a base part;
a plurality of finger connection parts provided on the base part such that some of the plurality of finger connection parts are connected to the base part; and
a plurality of finger modules respectively connected to the plurality of finger connection parts so as to grasp an object, wherein:
among the plurality of finger connection parts, finger connection parts connected to the base part are respectively connected to adjacent finger connection parts by roll joints to thereby provide pairs of finger connection parts with each pair including a finger connection part connected to the base part and an adjacent finger connection part, and such that,
for each of the pairs, when the finger connection part connected to the base part of the respective pair is driven, the adjacent finger connection part of the respective pair is rotated together with the finger connection part connected to the base part of the respective pair;
the finger connection parts adjacent to the finger connection parts connected to the base part are drivable separately from the finger connection parts connected to the base part so that the plurality of finger modules performs symmetrical grasping; and
the plurality of finger connection parts connected by the roll joints is driven by via connection of pulleys and belts.

12. The robot hand according to claim 11, wherein:
the finger connection parts connected to the base part include a second finger connection part and a third finger connection part;
the roll joints include a first roll joint and a second roll joint; and
the second finger connection part is connected to a first finger connection part adjacent to the second finger connection part by the first roll joint and the third finger connection part is connected to a fourth finger connection part adjacent to the third finger connection part by the second roll joint.

13. The robot hand according to claim 12, wherein the first and second roll joints are formed so as to surround wires in a figure 8 shape.

14. The robot hand according to claim 13, wherein:
in order to drive the second finger connection part and the first finger connection part connected by the first roll joint and the third finger connection part and the fourth finger connection part connected by the second roll joint, motors are respectively installed in the finger connection parts;
a first small pulley is fixed to the motor installed in the first finger connection part, a second small pulley is fixed to the motor installed in the second finger connection part, a third small pulley is fixed to the motor installed in the third finger connection part, and a fourth small pulley is fixed to the motor installed in the fourth finger connection part; and
a first large pulley and a second large pulley are fixed to the second finger connection part and the third finger connection part.

15. The robot hand according to claim 14, wherein a first belt is configured to connect the first small pulley, the first large pulley and the third small pulley so as to transmit rotary force among the first small pulley, the first large pulley and the third small pulley, and a second belt is configured to connect the second small pulley, the second large pulley and the fourth small pulley so as to transmit rotary force among the second small pulley, the second large pulley and the fourth small pulley.

16. The robot hand according to claim 15, wherein:
when the second small pulley is rotated by the motor installed in the second finger connection part, the second large pulley connected to the second small pulley by the second belt is rotated, and when the second large pulley is rotated, the third finger connection part to which the second large pulley is fixed is rotated; and
when the third small pulley is rotated by the motor installed in the third finger connection part, the first large pulley connected to the third small pulley by the first belt is rotated, and when the first large pulley is rotated, the second finger connection part to which the first large pulley is fixed is rotated.

17. The robot hand according to claim 16, wherein:
when the third finger connection part is rotated, the fourth finger connection part connected to the third finger connection part by the second roll joint is rotated together with the third finger connection part; and
when the second finger connection part is rotated, the first finger connection part connected to the second finger connection part by the first roll joint is rotated together with the second finger connection part.

18. The robot hand according to claim 17, wherein:
when the first small pulley is rotated by the motor installed in the first finger connection part, the first finger connection part is rotated about the second finger connection part; and
when the fourth small pulley is rotated by the motor installed in the fourth finger connection part, the fourth finger connection part is rotated about the third finger connection part.

19. A robot hand comprising:
a base part;
a plurality of finger connection parts provided on the base part such that some of the plurality of finger connection parts are connected to the base part; and
a plurality of finger modules respectively connected to the plurality of finger connection parts so as to grasp an object, wherein:
among the plurality of finger connection parts, finger connection parts connected to the base part are respectively connected to adjacent finger connection parts by roll joints to thereby provide pairs of finger connection parts with each pair including a finger connection part connected to the base part and an adjacent finger connection part, and such that,
for each of the pairs, when the finger connection part connected to the base part of the respective pair is driven, the adjacent finger connection part of the respective pair is rotated together with the finger connection part connected to the base part of the respective pair;
the finger connection parts adjacent to the finger connection parts connected to the base part are drivable separately from the finger connection parts connected to the base part so that the plurality of finger modules performs symmetrical grasping; and
the plurality of finger connection parts connected by the roll joints is driven via connection of gears.

20. The robot hand according to claim 19, wherein:
the finger connection parts connected to the base part include a second finger connection part and a third finger connection part;
the roll joints include a first roll joint and a second roll joint; and
the second finger connection part is connected to a first finger connection part adjacent to the second finger connection part by the first roll joint and the third finger connection part is connected to a fourth finger connection part adjacent to the third finger connection part by the second roll joint.

21. The robot hand according to claim 20, wherein the first and second roll joints are formed so as to surround wires in a figure 8 shape.

22. The robot hand according to claim 21, wherein the gears include spur gears.

23. The robot hand according to claim 22, wherein:
in order to drive the second finger connection part and the first finger connection part connected by the first roll joint and the third finger connection part and the fourth finger connection part connected by the second roll joint, motors are respectively installed in the finger connection parts;
a first small gear is fixed to the motor installed in the first finger connection part, a second small gear is fixed to the motor installed in the second finger connection part, a third small gear is fixed to the motor installed in the third finger connection part, and a fourth small gear is fixed to the motor installed in the fourth finger connection part; and
a first large gear and a second large gear are fixed to the second finger connection part and the third finger connection part.

24. The robot hand according to claim 23, wherein:
when the second small gear is rotated by the motor installed in the second finger connection part, the second large gear is rotated by the rotation of the second small gear, and when the second large gear is rotated, the third finger connection part to which the second large gear is fixed is rotated; and
when the third small gear is rotated by the motor installed in the third finger connection part, the first large gear is rotated by the rotation of the third small gear, and when the first large gear is rotated, the second finger connection part to which the first large gear is fixed is rotated.

25. The robot hand according to claim 24, wherein:
when the third finger connection part is rotated, the fourth finger connection part connected to the third finger connection part by the second roll joint is rotated together with the third finger connection part; and
when the second finger connection part is rotated, the first finger connection part connected to the second finger connection part by the first roll joint is rotated together with the second finger connection part.

26. The robot hand according to claim 25, wherein:
when the first small gear is rotated by the motor installed in the first finger connection part, the first finger connection part is rotated about the second finger connection part; and
when the fourth small gear is rotated by the motor installed in the fourth finger connection part, the fourth finger connection part is rotated about the third finger connection part.

27. The robot hand according to claim 21, wherein the gears include internal gears.

28. The robot hand according to claim 27, wherein:
in order to drive the second finger connection part and the first finger connection part connected by the first roll joint and the third finger connection part and the fourth finger connection part connected by the second roll joint, motors are respectively installed in the finger connection parts;
a first small gear is fixed to the motor installed in the first finger connection part, a second small gear is fixed to the motor installed in the second finger connection part, a third small gear is fixed to the motor installed in the third finger connection part, and a fourth small gear is fixed to the motor installed in the fourth finger connection part; and
a first internal gear and a second internal gear are fixed to the second finger connection part and the third finger connection part.

29. The robot hand according to claim 28, wherein:
when the second small gear is rotated by the motor installed in the second finger connection part, the second internal gear is rotated by the rotation of the second small gear, and when the second internal gear is rotated, the third finger connection part to which the second large gear is fixed is rotated; and
when the third small gear is rotated by the motor installed in the third finger connection part, the first internal gear is rotated by the rotation of the third small gear, and when the first internal gear is rotated, the second finger connection part to which the first large gear is fixed is rotated.

30. The robot hand according to claim 29, wherein:

when the third finger connection part is rotated, the fourth finger connection part connected to the third finger connection part by the second roll joint is rotated together with the third finger connection part; and when the second finger connection part is rotated, the first finger connection part connected to the second finger connection part by the first roll joint is rotated together with the second finger connection part.

31. The robot hand according to claim 30, wherein:

when the first small gear is rotated by the motor installed in the first finger connection part, the first finger connection part is rotated about the second finger connection part; and when the fourth small gear is rotated by the motor installed in the fourth finger connection part, the fourth finger connection part is rotated about the third finger connection part.

32. An apparatus comprising:
a robot hand including:
   a base part,
   a second finger connection part directly connected to the base part,
   a third finger connection part directly connected to the base part,
   a first finger connection part connected to the second finger connection part via a first roll joint, and not directly connected to the base part, so that, when the second finger connection part is driven, the first finger connection part is driven together with the second finger connection part and thereby performs a rolling motion, and
   a fourth finger connection part connected to the third finger connection part via a second roll joint, and not directly connected to the base part, so that, when the third finger connection part is driven, the fourth finger connection part is driven together with the third finger connection part and thereby performs a rolling motion, wherein:
     the first finger connection part is drivable separately from the second finger connection part, and
     the fourth finger connection part is drivable separately from the third finger connection part.

33. An apparatus according to claim 32, wherein:

the first finger connection part is adjacent to the second finger connection part; and the third finger connection part is adjacent to the fourth finger connection part.

* * * * *

UNITED STATES PATENT AND TRADEMARK OFFICE
CERTIFICATE OF CORRECTION

| | | |
|---|---|---|
| PATENT NO. | : 8,814,241 B2 | Page 1 of 1 |
| APPLICATION NO. | : 13/229841 | |
| DATED | : August 26, 2014 | |
| INVENTOR(S) | : Yong Jae Kim et al. | |

It is certified that error appears in the above-identified patent and that said Letters Patent is hereby corrected as shown below:

On the Title Page

Item [57] (Abstract), Column 2, Line 11, After "each pair" insert -- of --.

Signed and Sealed this
Eighteenth Day of November, 2014

Michelle K. Lee
*Deputy Director of the United States Patent and Trademark Office*